Feb. 16, 1932. H. E. GINTHER 1,845,262
THERMOSTATICALLY CONTROLLED MECHANISM
Filed June 26, 1929 2 Sheets-Sheet 1

Inventor
Howard E. Ginther
by Rector, Hibben, Davis & Macauley Attys

Feb. 16, 1932.  H. E. GINTHER  1,845,262
THERMOSTATICALLY CONTROLLED MECHANISM
Filed June 26, 1929   2 Sheets-Sheet 2
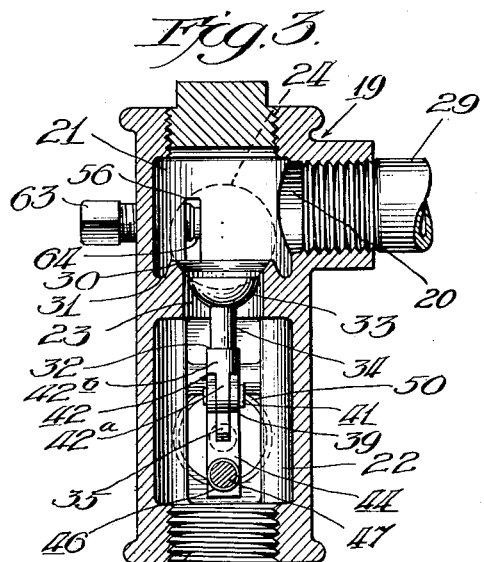
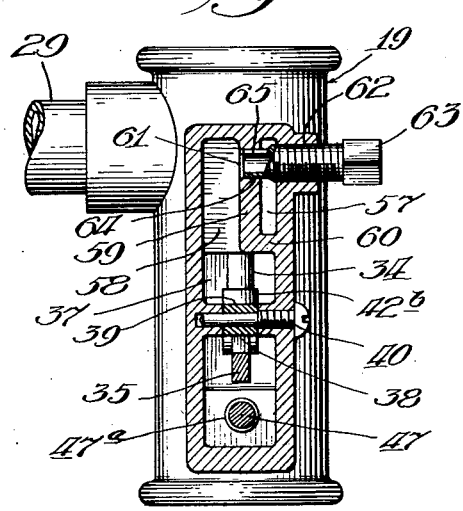
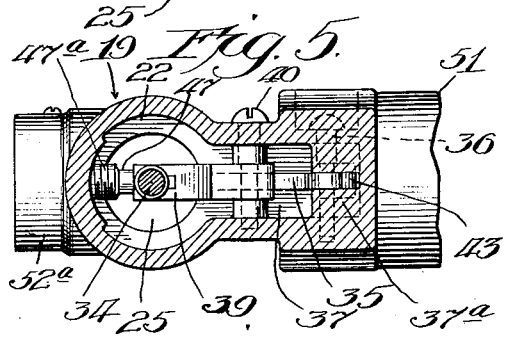
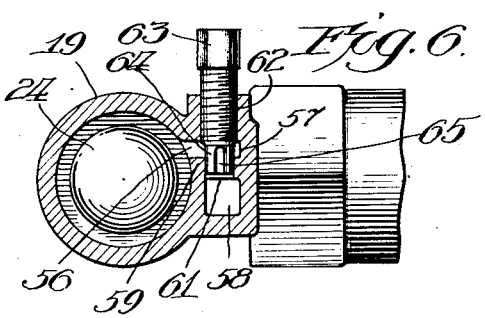
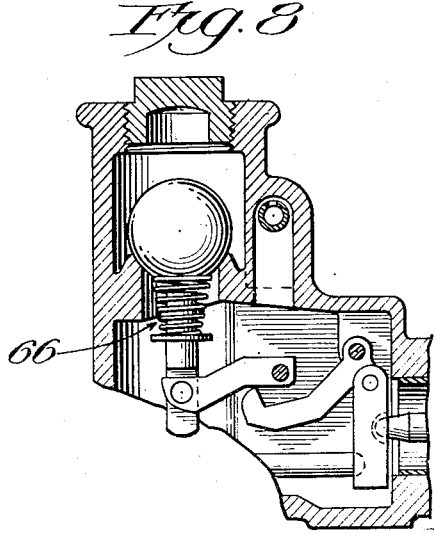
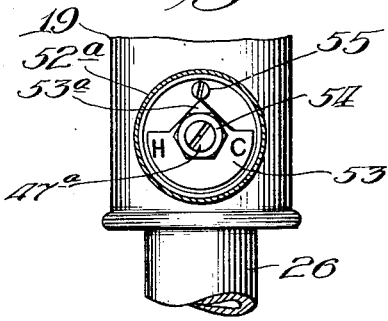
Inventor:
Howard E. Ginther
by Rector, Hibben, Davis & Macauley
Attys Patented Feb. 16, 1932

1,845,262

UNITED STATES PATENT OFFICE

HOWARD E. GINTHER, OF LA PORTE, INDIANA, ASSIGNOR TO BASTIAN-MORLEY COMPANY, OF LA PORTE, INDIANA, A CORPORATION OF INDIANA

THERMOSTATICALLY CONTROLLED MECHANISM

Application filed June 26, 1929. Serial No. 373,756.

My invention relates to thermostatically controlled mechanism, and has to do especially with mechanisms of this character adapted to control the movement of a valve, or similar, element.

One of the fields of utility of my thermostat invention is that to which water heating apparatus belongs, and, to facilitate explanation of my invention and in order that its advantages may be readily appreciated, I will refer to the same in its application to water heating apparatus.

Two forms of thermostatic mechanisms have come into general use in the water heating apparatus field for the flow-control of a combustible medium to a burner for bringing the temperature of the water to and maintaining it at a predetermined temperature. One of such forms may be referred to as the "snap-action" type where the cutting in and out of the combustible medium is effected completely and instantaneously by a rapid snap-like action of the valve element; and the other form may be referred to as the "graduated-action" type which serves to cut in and out the combustible medium by a gradual movement of the valve element away from and toward its closing-seat. The particular conditions of use, the form of heating means employed, etc., determine mainly which of these forms of thermostatic mechanism is to be employed in a particular appliance, all of which is well understood by those familiar with this art.

In supplying thermostatic mechanisms to meet the foregoing conditions of use, it is highly desirable to employ thermostatic control mechanism embodying a minimum number of parts, which parts should be universally applicable and which may serve as well for snap-action as well as for graduated-action devices; and one of the objects of my invention is to provide such a universally-applicable mechanism which operates with equal efficiency in snap-action as in graduated-action devices. More particularly, my invention provides thermal elements and co-acting levers which are readily interchangeable for snap-action and graduated-action valve elements.

Another object is to provide thermostatic mechanism of a character adapted to operate with maximum efficiency over a short temperature range whereby, in its application to snap-action valve mechanism, the cutting in and out of the combustible medium will take place more rapidly and over such a short range as to keep the water more nearly at the desired, uniform and predetermined temperature than has been possible with previously-employed structures of this character; and in its application to the graduated-action valve mechanism is adapted to provide for shorter periods for cutting the combustible medium in "full" and for cutting it out to increase the heating efficiency of the appliance as a whole (the heating means being more efficient when on "full").

Another object is to provide mechanism of the foregoing character embodying motion-multiplying levers pivotally supported in such a way that the main motion pivots and bearings are located out of the main path of the combustible medium passing through the mechanism, whereby foreign matter in the combustible medium will not collect on such pivots to cause a sluggish gravity-action motion of such levers. This feature of my invention insures free, positive acting parts, whereby the flow of the combustible medium is controlled more exactly according to the temperature conditions to be controlled.

Still another object of my invention is to provide in the foregoing mechanism improved combustible medium by-pass means which is capable of adjustment with precision, and which is adapted to effect a by-passing of the combustible medium at one point only whereby clogging, and undue restriction of the by-pass channel, is prevented by the flow action of the medium therethrough.

Additional objects are to provide an improved system of motion-multiplying levers for controlling the movement of the valve element, which levers are arranged to operate in series without lost motion; to provide such a system of levers, as above described, having a positive gravity-movement action; to provide a thermostatic mechanism which in its entirety is very compact, which is simple in construction and cheap to manufacture; to provide for the use of smaller and more compact thermal elements; to provide for greater multiplication with a fewer number of levers; and to provide a mechanism of the foregoing character adapted to be enclosed in a casing adapted for readiness and ease in assembly of the thermal-mechanism parts and levers therein.

Other objects and advantages will become apparent as this description progresses and by reference to the drawings wherein:—

Fig. 3 is a transverse vertical sectional view taken substantially on line 3—3 of Fig. 2;

Fig. 4 is a transverse sectional view taken substantially on line 4—4 of Fig. 2 and looking in a direction opposite that of Fig. 3;

Fig. 5 is a horizontal sectional view taken substantially on line 5—5 of Fig. 2;

Figure 2:
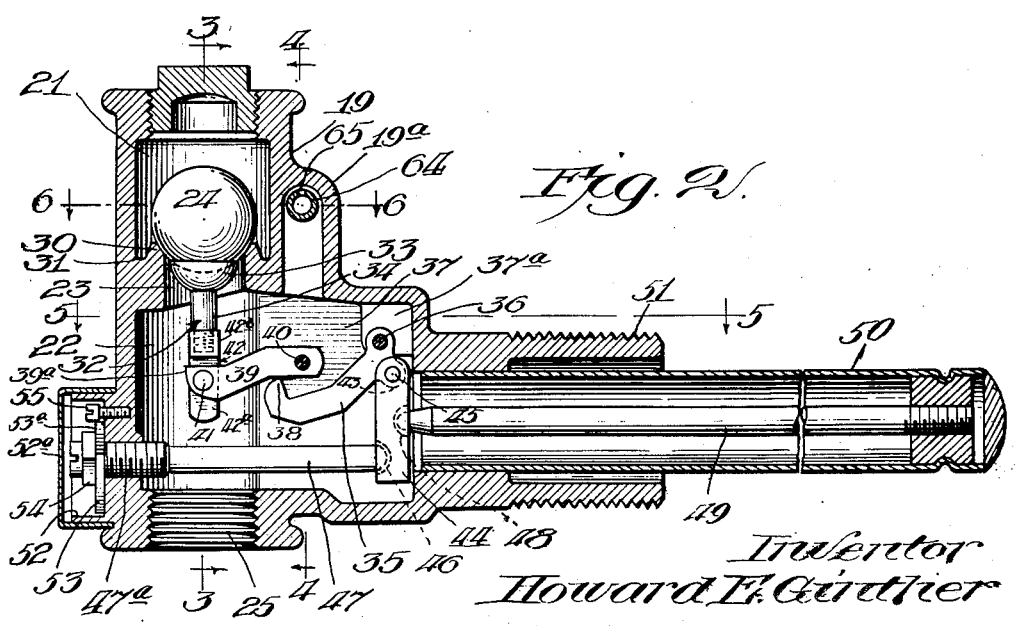
Fig. 2 is an enlarged vertical sectional view of the thermostatic mechanism shown in Fig. 1 and embodying my invention.

Fig. 6 s a horizontal section taken substantially on line 6—6 of Fig. 2 and showing the by-pass structure;

Fig. 7 is a partial elevational view showing the adjustment indicator structure; and Fig. 8 is a vertical sectional view similar to Fig. 2, but showing my invention associated with mechanism of the snap-action type.

It will be understood that while I have shown my invention as associated with a particular form of water heating apparatus, yet I do not wish to be limited to such use because it is obvious that my invention has utility in other environments where the attainment of its advantages are found desirable.

Figure 1:
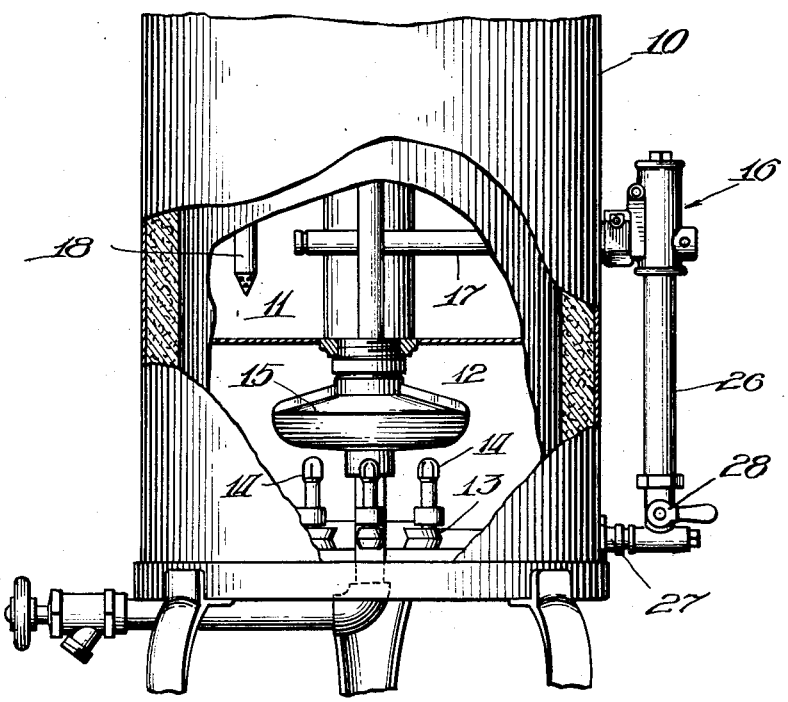
Figure 1 is a fragmental elevational view, partially in section, showing a form of water heating apparatus with my invention applied thereto for graduated action operation.

Referring particularly to the heating apparatus shown in Fig. 1, it comprises an outer shell 10 enclosing a storage tank 11, the walls of these parts being extended downwardly to provide a combustion chamber 12 in which is located a gas burner 13 having upwardly directed nozzles 14 which direct hot gases of combustion against a spreader type heating element 15 which is also located in the combustion chamber.

The combustible medium which is fed to the burner 13 may take the form of gas; and it is desirable for automatic operation and automatic control of the heating apparatus to provide some means to control the flow of the gas to the burner in accord with and as determined by the temperature of the water in the tank 11. My invention has to do particularly with thermostatic mechanism, indicated generally at 16 (Fig. 1), for controlling the flow of the gas directly by the temperature of the water in the tank, this being accomplished through the medium of a thermal-unit 17 (and associated mechanism to be described later) which projects, preferably, into the lower part of such tank adjacent the discharge end of the cold water inlet pipe 18.

The mechanism which I provide, in accordance with my invention, takes the form of a casing 19 (Fig. 2) which is provided with a gas inlet 20 leading into an upper gas chamber 21, which chamber communicates with a lower chamber 22 through a passageway 23 controlled by the ball valve 24. The bottom of the lower chamber 22 is provided with a gas outlet 25 which is connected by pipes 26 and 27 to the burner 13. The flow of the gas through the pipes 26 and 27 may be cut in or out independently of the thermostatic mechanism by a suitable gas cock 28. The gas inlet 20 is connected to a suitable gas supply by means of a pipe 29 (Fig. 3).

The upper part of the inner wall surface of the casing 19 forming the valved passage 23 is extended upwardly to provide a circular valve seat 30. This construction provides a circular dirt, sediment, and the like, receiving pocket 31 around the outer part of the seat. The seat is of such size and so shaped as to receive the ball valve 24 on its upper surface, which valve, when seated, being adapted to close communication between the upper and lower chambers 21 and 22 and, when open, opening communications between said chambers so that gas flowing through the inlet 20 may pass on through the casing, through the outlet 25 and to the burner 13. The valve 24 is freely supported for movement toward and from its seat 30 by means of a member 32 having a cup-shaped head 33 upon which the ball is seated and a stem 34 fixed to and depending from such head 33 which stem is adapted to be reciprocated by thermally-controlled, motion-multiplying means which will now be described.

The movement of the ball valve 24 is accomplished by means of a plurality of motion-multiplying levers which are arranged for operation in series in such a way that very slight movement of the prime-moving means effects a substantial movement of the valve support 32 sufficient to bring the ball valve to its full open position. Specifically, in a laterally offset extension 37 of the lower chamber 22 I employ what I may term a primary lever 35 having its outer end (or end farthest from the main gas flow path) pivotally mounted by a pin 36 in a reduced section 37ª of such extension space. This primary lever takes, preferably, a general U-shape with its inner end turned upwardly and shaped to provide a line-contact, friction-reducing end-bearing indicated by the numeral 38. The bearing 38 of the primary lever is adapted to engage the underside of what I may term a secondary lever 39 which has its one end pivotally supported by a pivot pin 40 in the offset chamber space 37 at a point to one side of the main gas path through the chamber 22; and the other end of this lever extends inwardly into the lower chamber in a generally-horizontal direction. The inner, bifurcate end of the secondary lever is pivotally connected by a pintle 41 to a flat depending part 42ª of an element 42 which has an upper cylindrical part 42ᵇ into which the depending stem 34 of the valve support 32 is detachably screwed. This arrangement provides a shoulder at the juncture of the flat tongue part 42ª and the part 42ᵇ which shoulder is engaged by the projecting end 39ª of the secondary lever to limit the relative pivotal movement between the secondary lever and the element 42.

It will be noted from Fig. 2 that, according to my invention, the end bearing 38 of the primary lever engages the underside of the secondary lever immediately adjacent the pivot 40 of the secondary lever so that slight upward or downward movements of the inward end of the primary lever will transmit a much wider movement to the inner end of the secondary lever and consequently to the valve 24. Furthermore, the lever pivots 36 and 40 as well as the bearing between the secondary and primary levers are located out of the gas-flow path whereby such pivots and bearing will be kept clean and will not become "gummed" and sticky and the swinging movements of such levers will be positive and free even when gravity-operated under the weight of the ball valve.

Movement is transmitted to the primary lever as follows: The outer, or pivoted, end of the primary lever is provided with a depending arm 43 which, in the position of the lever shown in Fig. 2, projects outwardly from the primary pivot 36 and which, preferably, is in approximate vertical alignment with the pivot 36 in a horizontal position of such primary lever. A table lever 44, suspended in vertical position, in the laterally disposed space 37, has its upper bifurcate end pivotally connected to the primary lever arm 43 by a pintle 45. The inner, lower side surface of the lever 44 is provided with a rounded depression or socket 46 in which the rounded end of an abutment element 47 engages. This abutment element is provided with a threaded head part 47ª which adjustably engages an opening at the side of the casing opposite the lever 44, the adjustment of such abutment being provided for a purpose which will be referred to more in detail hereinafter. The side of the table lever 44 opposite the abutment 47 is provided at its mid-portion with a socket or depression 48 in which is seated the rounded end of a thermal element 49 formed of a material of low coefficient of expansion, such, for example, as invar metal. This rod 49 is supported at its outer end by screw threaded engagement with the headed end of a tube 50 formed of material having a high coefficient of expansion, such, for example, as copper. This tube 50 is, in turn, supported at its inner end by a hollow lateral extension 51 of the casing 19, the connection between such extension and the tube being sealed in any desired manner to prevent the escape of gas therepast. In this arrangement (Fig. 2) it will be noted that the pivotal connection between the table lever and the primary lever is immediately adjacent the pivotal mounting of the primary lever whereby movement of the table lever transmitted to the primary lever will be greatly multiplied at the inner or secondary-lever-engaging end of the primary lever. There is a somewhat less motion multiplication in the movement of the table lever due to the respective positions of engagement of the abutment 47 and the rod 49.

Assuming that the thermostatic mechanism is associated with the storage tank of a water heating apparatus, as illustrated in Fig. 1, the operation of the structure so far described is as follows: At the beginning, with the water in the storage tank 11 unheated, the thermal tube 50 is cold and fully contracted thereby moving the rod 49 to its extreme inward position and swinging the pivoted end of the table lever inward and the bearing end of the primary lever as well as the inner end of the secondary lever upward to a greatly multiplied extent wherein the ball valve 24 is unseated permitting a full flow of the gas from its source to the burner 13. In the graduated-action form of Fig. 2, as soon as the burner 13 is lighted and the temperature of the water in the tank begins to rise, a corresponding expansion movement of the tube 50 takes place with a corresponding movement (gradual with the gradual heating of the water) until finally the tube 50 has expanded (when the maximum desired water temperature is reached) to an extent wherein the secondary lever 39 has dropped down sufficiently under the weight of the valve 24 to seat such valve thereby cutting off the direct flow of gas to the burner 13. Due to the motion-multiplying action of the levers 35 and 39, the complete closing of the valve will take place upon a very small expansion movement of the tube 50. Consequently, a much smaller expansion tube 50 (and rod 49) may be employed than has been possible with the devices herebefore used, and the period of bringing the burner 13 on "full" and cutting it off is considerably shortened.

The adjustable abutment 47 serves as a means for adjusting the temperature of the water in the storage tank; that is, it serves as the means for controlling the point at which the thermostat will function to cut off the direct flow of gas. Specifically, turning of the abutment 47 (by means of its kerfed projecting head 47ᵇ) to the right swings the pivoted end of the table lever to a farther inwardly normal position thereby raising the relative positions of the primary and secondary levers, and likewise raising the ball 24, so that the expansible tube 50 will have to expand to a greater extent (the water will have to become hotter in the storage tank) before the levers will be dropped down far enough to seat the ball 24; and the converse is true when the abutment 47 is screwed toward the left.

In order that the user may more accurately determine and make the desired adjustments, an indicator is provided. Specifically, that part of the casing through which the threaded end of the abutment 47 projects is provided with an exterior, cylindrical hollow extension 52 which serves as a housing for the projecting end of such abutment. This abutment end has threadedly mounted thereon a semi-circular disk 53 which has a midpointer-part 53ª, which disk is locked upon the abutment by means of a nut 54. The left side of the disk 53 bears a marking indicating "Hot" and the opposite side bears a marking indicating "Cold", while the midpointer-part of the disk indicates a "Medium" heat or temperature of the water. A stop screw 55 is mounted on the casing within the indicator housing 52 and the disk (and abutment 47) may be rotated to the right until the edge of the disk strikes such stop screw thusly determining the limit or range of "Hot" adjustment which may be made from any particular or original setting of the abutment 47. The foregoing is likewise true with respect to the "Cold" adjustment when the abutment is turned to the left. The indicator structure is covered by a cap 52ª which slidingly fits over the extension 52.

My invention also has to do with by-pass structure adapted to feed a pilot supply of the combustible medium to the burner 13 when the valve 24 is closed whereby such burner 13 will continue to burn with a pilot flame. More particularly, the casing 19, of one side of its upper chamber 21 is provided with a lateral, hollow by-pass extension 19ª (Figs. 2, 3, 4, and 6) the inlet chamber portion of which is in communication with the upper chamber 21 through a relatively narrow, oblong opening 56 through the wall of the latter, which opening is, preferably, of the length approximating that indicated in Fig. 3. The interior of the by-pass extension is divided into what I may term a by-pass inlet chamber 57 and a by-pass outlet chamber 58 by means of a vertical partition wall 59. The bottom of the by-pass inlet chamber 57 is closed by a horizontal wall part 60 (Fig. 4) and the bottom of the by-pass outlet chamber 58 is open into the laterally-offset part 37 of the lower chamber 22. The vertical partition wall 59 between the by-pass chambers 57 and 58 is provided with a small opening 61 providing the sole communication between the two by-pass chambers and the sole by-pass communication between the upper chamber 21 and the lower chamber 22. To adjustably control or by-pass the combustible medium around the ball valve 24 through these by-pass chambers, I employ an adjusting screw 63 which threadedly engages an opening 62 in the exterior side wall of the casing extension 19ª adjacent the by-pass inlet chamber 57 and in alignment with the partition by-pass opening 61. The inner end 64 of this by-pass screw is reduced and is of a hollow cylindrical shape adapted to snugly engage the by-pass partition opening 61. The side wall of the hollow end of this by-pass screw is provided with a single, narrow, longitudinal slot 65. With the by-pass adjusting screw 63 in place with its reduced end 64 engaging the by-pass partition opening 61, the sole means of communication between the by-pass chambers 57 and 58 is through the active area of the slot 65 and the tubular end part 64 of the screw, and this is true regardless of the relative position of the slot 65 around the wall of the opening 61. With this arrangement, it is obvious that the screw 63 may be adjusted inwardly to an extent to entirely close the by-pass opening 61; but when this screw is in a position leaving the slot 65 in communication with the by-pass inlet chamber 57, such slot together with the adjacent wall of the vertical partition 59 forms a restricted orifice (Fig. 4) serving as the sole flow-communication between the chambers 57 and 58. Adjustment of the screw 63 in the desired direction will likewise adjust the size of such orifice and determine the rate and extent of flow of the combustible medium for pilot purposes and, consequently, will determine the nature of the pilot flame. Further, since the sole by-pass flow must take place through this restricted orifice, such orifice is always kept free of foreign materials in the combustible medium which might, otherwise, tend to clog and unduly restrict the by-pass flow.

In Fig. 8 I have illustrated the manner of converting the "graduated-action" arrangement for "snap-action". Specifically, for the "graduated-action" support 32 of the form of Fig. 2 I merely substitute valve structure indicated generally by the numeral 66, which structure, preferably, takes the form shown and described in my copending application, Serial No. 249,092, filed January 24, 1928, for Operating mechanism. The structure of Fig. 8 operates the same as the structure of Fig. 2 except for the by-pass control and the valve snap action as clearly explained in my above-identified copending application. In this form the by-pass adjusting screw is set to close the by-pass opening and a suitable by-pass pipe (not shown) is used to supply gas to any desired form of pilot light means (not shown).

The advantages of my invention will be obvious from the foregoing. The structure is compact and, while being simple in construction and cheap to manufacture, gives maximum control efficiency. Clogging, gumming, etc., of pivots and bearings is prevented and the movement of the levers is free and positive. A short temperature range is provided for by which the temperature of the medium to be controlled may be maintained at more exactly the predetermined, desired temperature. Clogging of the by-pass is positively prevented. In both "snap-action" and "graduated-action" mechanisms, my invention serves to keep the water at a more uniform temperature by causing the mechanism to act upon a minimum temperature drop, which serves to give a maximum hot water recovery for a given size tank.

While I have shown only one form of my invention (and in its adaptability to both graduated-action and snap-action valve mechanisms) it is to be understood that other changes in details and arrangement of parts may be made without departing from the spirit and scope of my invention as defined by the claims which follow.

I claim:

1. In structure of the character described, a casing having fuel flow connections, a valve in said casing for controlling the flow of fuel through one of said connections, means for actuating said valve including a thermo-element, a plurality of motion-multiplying levers, and a lever actuating element controlled by said thermo-element, said levers including one lever pivotally supported at one end and having a friction-reducing bearing element on its other and free end, a second lever pivotally supported at one end and having its underside frictionally engaging said bearing element of the one lever, a third lever, an adjustable rod having an end upon which the free end of the third lever is fulcrumed, said third lever being pivotally connected at its other end to said one lever, said lever-actuating element acting upon said third element to move said one and second levers.

2. In thermostatic mechanism, a casing having fuel connections, a valve in said casing for controlling the flow of fuel therethrough, and means for operating said valve comprising a pair of levers each pivotally mounted at one end in said casing, a bearing element on the non-pivoted end of one of said levers and upon which the other of said levers freely rests, a third lever having one end pivotally connected to one of the levers of said pair, a fulcrum element frictionally engaging and supporting the other end of said third lever, and thermal means for imparting motion to said third lever.

3. In thermostatic mechanism, a casing having fuel connections, a valve in said casing for controlling the flow of fuel therethrough, and means for operating said valve comprising a pair of superimposed, overlapping levers each pivotally mounted at their same ends to one end in said casing with their pivots offset horizontally, one of said levers having a bearing element upon its non-pivoted end and engaging the other of said levers immediately adjacent the pivotal mounting of the latter, a third lever having one end pivotally connected to said one lever immediately adjacent the pivotal mounting of the latter, a fulcrum element supporting the other end of said third lever, and a thermo-active element acting on said third lever to impart motion thereto and to said pair of levers.

4. In thermostatic mechanism, a casing having flow-connections leading thereto and therefrom, a valve in said casing for controlling communication between said connections, a motion-multiplaction lever system for opening and closing said valve including a pair of levers each pivoted at its outer end to said casing at a point out of the main flow path through said casing, one of said levers having a bearing element which engages the underside of the other of said levers for supporting the latter, another lever pivoted to said one lever of the pair adjacent the pivotal support of the latter, an abutment member upon which the end of the last-mentioned lever opposite its pivotal connection is fulcrumed, an actuator for said last-mentioned lever for moving it about said abutment, and a thermo-active element controlling the movement of said actuator.

5. In thermostatic mechanism, a casing having flow connections leading thereto and therefrom, a valve for controlling communication between said connections and the flow of fuel through said casing, a motion-multiplication lever system for moving said valve including a pair of levers each pivoted at its outer end to said casing, one of said levers having its free end upturned to provide a bearing element and the other of said levers having its underside engaged with said bearing element near the pivotal support of the latter lever, a third lever pivotally connected at one end to said one lever of the pair adjacent the pivotal support of the latter lever, an abutment engaged by the other end of said third lever, a member for imparting movement to said third lever, and a thermo-active element for controlling the movement of said member.

6. In a device of the character described, a valve, a motion-multiplaction lever system for operating said valve including a pair of vertically spaced levers disposed in a generally horizontal position, a fixed pivotal support for the outer ends of each of said levers, their inner ends being free, the lower of said levers having its free end upturned to provide a bearing upon which the other of said levers of the pair rests at a point immediately adjacent its pivotal support, the latter of said levers being directly associated with said valve for opening and closing movements of the latter, an adjustable member for imparting movement to said one lever of the pair, an actuator for said member, and a thermo-active element controlling said actuator.

7. In thermostatic control mechanism, a casing having fluid-flow connections, a valve for controlling the flow of fluid through said casing, and means for opening and closing said valve including a primary lever pivotally supported at one end and free at the other end, a secondary lever pivotally supported at one end and free at its other end, the free end of said primary lever frictionally engaging the underside of said secondary lever, a valve-engaging element pivotally associated with the free end of said secondary lever and means for imparting upward swinging motion to said primary lever to swing said secondary lever upward.

8. In thermostatic control mechanism, a casing having fluid-flow connections, a valve for controlling the flow of fluid through said casing, and means for opening and closing said valve including a comparatively long primary lever pivotally supported at one end and free at the other end, a comparatively long secondary lever pivotally supported at one end and free at its other end, the free end of said primary lever frictionally engaging the underside of said secondary lever adjacent the pivoted support of the latter, a valve-engaging element pivotally associated with the free end of said secondary lever, and means acting on said primary lever adjacent the pivoted support of the latter for imparting upward swinging motion to said primary lever to swing said secondary lever upward.

9. In thermostatic control mechanism, a casing having a passageway therethrough, a valve controlling said passageway, and means for controlling said valve including a pair of levers pivotally connected together, one of said levers of the pair adjacent its pivotal connection with the second and at a point immediately thereabove being pivotally fixed to said casing, a third lever associated with said valve and having one end pivotally connected to said casing and so positioned that its under surface frictionally and directly engages the upper surface of said one lever of said pair, all said levers being associated for series movement, and means for imparting movement to said second lever of the pair to move all said levers and said valve in succession, including an adjustable abutment associated with said second lever.

10. In thermostatic control mechanism, a casing having a passageway therethrough, a valve controlling said passageway, and means for controlling said valve including a pair of levers pivotally connected together, one of said levers of the pair adjacent its pivotal connection with the second being pivotally fixed to said casing, a third lever associated with said valve and having one end pivotally connected to said casing and so positioned that its under surface adjacent its pivotal support frictionally engages the upper surface of the non-pivoted end of said one lever of said pair, all said levers being associated for series movement, and means, including an adjustable abutment supporting one end of said second lever and a thermo-active element, for imparting movement to said second lever of the pair to move all said levers and said valve in succession, said adjustable abutment and thermo-active element engaging the non-pivoted end of the second lever at spaced points whereby expansive movement of the thermo-active element rocks the second lever about the adjustable abutment to swing the first lever about its pivotal connection to thereby raise the said third lever and permit the levers to resume their normal positions by gravity upon the contraction of the thermo-active element.

11. In mechanism of the character described, a casing divided into an upper and a lower chamber, a valve for directly controlling communication between said chambers, and by-pass means between said chambers comprising a chambered extension on said casing, a partition in said extension dividing its chamber into two parts one of which is connected to said upper chamber and the other to said lower chamber, said partition having a cylindrical opening, and an adjustable member carried by said casing and having a tubular end part snugly engaging said partition opening, said tubular end having an elongated slot coacting with said partition wall to form an adjustable orifice serving as the sole communication between the two parts of said extension chamber.

12. In mechanism of the character described, a casing divided into an upper and a lower chamber, a valve for directly controlling communication between said chambers, and by-pass means between said chambers comprising a chambered extension on said casing, a partition in said extension dividing its chamber into two parts one of which is connected to said upper chamber and the other to said lower chamber, said partition having a cylindrical opening, and an adjustable screw member carried by said casing and having an open-ended tubular end part snugly engaging said partition opening, said tubular end having an elongated slot leading from its open end and coacting with said partition wall to form an adjustable orifice serving as the sole communication between the two parts of said extension chamber irrespective of the relative rotational position of said screw member to said partition wall.

13. In mechanism of the character described, a casing having a main flow-path therethrough, means in said casing for controlling the flow-path, and a by-pass around said means which includes means forming twin chambers communicating with each other and one chamber communicating with the main flow path on one side of said means and the other with the main flow path on the other side of said means, the communication between said chambers including a partition having an opening, an element having a tubular end fitting said opening and adjustable backward and forward with respect to said opening, said tubular end being slotted to its end at one point only, providing with the wall of said partition around said opening a variable orifice constituting the sole communication between said chambers.

14. In mechanism of the character described, a casing, means for controlling direct communication between the upper and lower parts of said casing, and means for by-passing said first means which comprises an offset chamber space in said casing, a partition in said space dividing said space into twin chambers one of which communicates with the upper part of said casing and the other communicates with the lower part of said casing, said partition having a circular opening, a member carried by said casing and having a tubular end part with a single longitudinal slot therein, said tubular end being adapted to fit snugly in said opening, said slot forming with the wall of said opening an orifice which together with the tubular end of said member provides the sole communication between said twin chambers and the sole by-pass communication between the upper and lower parts of said casing.

15. In thermostatic control mechanism, a valve, a motion-multiplication lever system for operating said valve including a pair of levers pivotally connected together near their ends, a fixed pivotal support for the end of one of said levers of the pair near its pivotal connection with the other of said levers, an adjustable support for the non-pivotally connected end of the other of said levers of the pair, a third lever associated with said valve and disposed in the path of movement of said one lever and adapted to be frictionally engaged by said one lever for reciprocating movement, and thermal means for imparting motion to said pair of levers to move said third lever and valve.

16. In a thermostatic mechanism, a casing having fuel connections, a valve in said casing for controlling the flow of fuel therethrough, and means for operating said valve comprising, a plurality of horizontally disposed levers one positioned above the other and each pivotally mounted at its same end to the casing with the pivots being offset vertically, whereby the uppermost of said levers rests upon a bearing member provided by another of said levers, an additional lever pivotally secured to the lower of said plurality of levers, an adjustable fulcrum member secured to the casing and having an end engaging the free end of said additional lever, and a thermo-element engaging the said additional lever at a point above the fulcrum member, whereby expansive movement of the thermo-element rocks the additional element about its fulcrum point, and swings said superimposed plurality of levers about their pivot points, said levers resuming their normal positions by gravity upon the contraction of the thermo-member.

17. In a thermostatic mechanism, a casing having fuel connections, a valve in said casing for controlling the flow of fuel therethrough, means for operating said valve, comprising, a plurality of horizontally disposed overlapping superimposed levers having the same ends thereof pivoted to the casing, one of said levers having a bearing element on the non-pivoted end thereof upon which another of said levers freely rests, means for simultaneously swinging said horizontally disposed levers to thereby raise the valve from its seat, said means comprising an additional lever hingedly secured to the lowermost of said horizontally disposed levers, an adjustable rod having its end engaging the free end of said additional element and constituting an adjustable fulcrum therefor, and a thermo-expansive rod engaging said additional lever at a point above its adjustable fulcrum whereby actuation of the thermo-rod turns the additional lever about its fulcrum and raises, against gravity, the said horizontally disposed levers to raise the valve.

In testimony whereof, I have subscribed my name.

HOWARD E. GINTHER.